Patented Sept. 5, 1950

2,521,113

UNITED STATES PATENT OFFICE 2,521,113

PROCESS FOR THE SYNTHESIS OF VINYL ESTERS OF CARBOXYLIC ACIDS

Frédéric François Albert Braconier, Strivay-Plainevaux, and Jean Dawance, Angleur, Belgium, assignors to Societe Belge de l'Azote et des Produits Chimiques du Marly, Liege, Belgium, a corporation of Belgium No Drawing. Application February 12, 1948, Serial No. 8,015, In Belgium March 21, 1944

Section 1, Public Law 690, August 8, 1946
Patent expires March 21, 1964

6 Claims. (Cl. 260—498)

This invention relates to the synthesis of vinyl esters of carboxylic acids from the appropriate acids and acetylene, according to the equation:

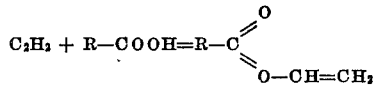

As is known, there are two principal methods for the direct synthesis for vinyl esters of carboxylic acids through the use of acetylene.

According to the first of these methods, the older one in date, it is carried out in a heterogeneous phase, liquid-gaseous. As in the synthesis of vinyl halide and in particular vinyl chloride, salts of mercury are utilized as catalysts either alone or in combination with other reactants.

According to a second method of direct synthesis, the reaction is carried out in the gaseous phase, using, as catalysts, zinc or cadmium salts of the carboxylic acids of which it is desired to prepare the vinyl esters, said salts being supported on active carbon.

Each of the foregoing methods present certain disadvantages. In the heterogeneous phase method, the catalysts having a mercury base decompose very rapidly and their regeneration is a rather difficult procedure. Further, it is difficult to prevent the formation of diesters of ethylidene such as the diacetate of ethylidene due to the fact that the principal reaction is always accompanied by a secondary reaction to a greater or less extent according to the operating conditions and which takes place according to the following equation:

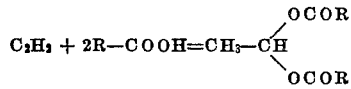

A disadvantage of the second or homogeneous phase method is the instability of the organic salts of zinc or of cadmium which, at the temperature of the reaction, either leave their carrier through sublimation, thus producing clogging of the outlet pipes of the reaction chamber, or decompose with the formation of ketones. Consequently, these catalysts have a relatively short period of activity and, moreover, are very expensive owing to the high price of active carbon.

The present invention provides a method and new and improved catalysts for use in carrying out the vapor phase synthesis of vinyl esters of carboxylic acids whereby the disadvantages attending the use of organic salts of zinc or cadmium as catalysts may be avoided.

According to the invention, a gaseous mixture of a carboxylic acid and acetylene is passed at an elevated temperature over a catalyst containing a member of the group consisting of silicates and polysilicates of zinc and cadmium.

It is known that the organic salts of zinc and cadmium are specific catalysts for the reactions, that is to say they catalyse especially the reaction of acetylene with the acid of which they themselves are formed. Thus, zinc acetate is employed as catalyst in the synthesis of vinyl acetate, whilst zinc butyrate, for example, lends itself to the synthesis of vinyl butyrate.

In contradistinction, the silicates used as catalysts according to the invention are of universal use for all the carboxylic acids without discrimination; this renders it possible for example, to make use of the same plant for the successive or alternate preparation of vinyl esters of different acids without the necessity of changing the catalyst. These new catalysts are much more efficacious and more resistant than catalysts consisting of zinc or cadmium salts of organic acids supported on active carbon. The period of their activity, which is far greater than that of zinc acetate on active carbon, is as much as several hundred hours on stream. Also, with a given volume of the new catalysts, it is possible, before they are exhausted, to produce a quantity of vinyl esters several times as great as that produced by the same volume of the old catalysts.

In addition, as it is not necessary to fix them on active carbon, as it is in the case of organic salts of zinc and cadmium, the cost of these new zinc or cadmium silicate or polysilicate catalysts is much lower.

The invention accordingly comprises the several steps, and the relation of one or more of such steps with respect to each of the others, and the composition possessing the features and properties, which are exemplified in the following detailed disclosure, and the scope of the invention will be indicated in the claims.

The preparation of the catalysts used according to the invention is very simple and easy.

In order to prepare, for example, a zinc silicate or polysilicate catalyst, more or less diluted solutions of 36° Bé. commercial sodium silicate are treated in the cold with a solution of a zinc salt. The chloride is preferably employed as the zinc salt since it is cheap and easy to prepare. A very varied range of gelatinous precipitates of silicates or polysilicates of zinc is obtained according to the molar ratio in which the aforesaid reagents are employed and according to the degree of dilution. These precipitates which, after being washed, if necessary, and centrifuged and partly or completely dried, are crushed and made into pellets or tablets and are then subjected to a further drying at about 140° C. and constitute, in these different forms, catalysts having great porosity, the apparent density of which is in the neighborhood of 0.5. They are all, although having different degrees of activity, excellent catalysts for the production of organic vinyl esters in general and of vinyl acetate in particular. Whilst being definitely superior to zinc acetate and to other organic salts of zinc, they are especially distinguished by their robustness and their extraordinary stability.

By precipitating, for example, by means of an acidified solution of zinc chloride, a solution containing an excess of sodium silicate in relation to the zinc chloride, it is also possible, by the same method of preparation, to obtain these catalysts in the form of active silica gels with a zinc silicate base. Owing to their great internal surface and the extreme dissemination of the active material, these gels have proved to be advantageous for certain applications.

The temperatures at which these catalysts are employed vary within certain limits which depend upon the nature and the composition of the zinc or cadmium silicate and upon the nature of the acid reacted with the acetylene. For the preparation of vinyl acetate, these temperatures are, for example, between 175° and 250° C., but are preferably kept as low as possible in order to avoid the formation of acetaldehyde as a by-product of the reaction.

If, for example, the mixture of acetic acid and an excess of acetylene is preheated before passing it into the catalysis chamber which has been brought to the required temperature, the exothermic heat of the reaction is generally sufficient to maintain the temperature of the catalyst.

The operative conditions which can be employed with these catalysts are illustrated by the following examples which are given merely by way of indication and are not of limitative character.

*Example I.*—A mixture of 4200 litres of acetylene and 1500 gms. of acetic acid was passed, per hour, into a catalysis chamber consisting of a nest of tubes heated by circulation of oil and containing 13 litres of zinc silicate catalyst (ratio $SiO_2/ZnO = 0.9$). The initial temperature was 170° C., but the temperature was progressively increased as the catalyst aged, so as to keep the rate of conversion of the acetic acid constant. This rate was about 60% by weight. The products of the reaction and the acetic acid which had not reacted were condensed by the usual cooling means; and the excess of acetylene was recycled. On continuous working, there were drawn off, per hour, 1750 to 1850 gms. of condensate having a density of about 0.960 and containing 67% to 70% of vinyl acetate and about 30% of acetic acid which was separated by distillation. No formation of ethylidene diacetate was observed, but only that of a small quantity of acetaldehyde.

*Example II.*—A mixture of 90 litres of acetylene and 40 gms. of butyric acid was passed, per hour, into a laboratory electric furnace containing 250 ccs. of the same zinc silicate catalyst as in Example I, the reaction temperature being kept at about 220° C. By condensation of the products of the reaction, there was obtained, a mixture containing approximately 70% by weight of vinyl butyrate in addition to butyric acid which had not reacted.

Since certain changes in carrying out the above method and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the synthesis of vinyl esters of carboxylic acids, which comprises passing a gaseous mixture of a carboxylic acid and acetylene at an elevated temperature over a catalyst composed essentially of a member of the group consisting of silicates and polysilicates of zinc and cadmium.

2. A process for the synthesis of vinyl esters of carboxylic acids, which comprises passing a gaseous mixture of a carboxylic acid and acetylene at an elevated temperature over a catalyst composed essentially of a member of the group consisting of silicates and polysilicates of zinc and cadmium, the acetylene being in an amount in excess of that required to react with the carboxylic acid.

3. A process for the synthesis of vinyl esters of carboxylic acids, which comprises passing a gaseous mixture of a carboxylic acid and acetylene at an elevated temperature over a catalyst composed essentially of a member of the group consisting of silicates and polysilicates of zinc and cadmium in conjunction with a silica gel.

4. A process for the synthesis of vinyl esters of carboxylic acids, which comprises passing a gaseous mixture of a carboxylic acid and acetylene at an elevated temperature over a catalyst composed essentially of a member of the group consisting of silicates and polysilicates of zinc and cadmium, the carboxylic acid and the acetylene being preheated prior to passage over the catalyst.

5. A process for the synthesis of vinyl acetate, which comprises passing a mixture of acetic acid and acetylene at an elevated temperature over a catalyst composed essentially of a member of the group consisting of silicates and polysilicates of zinc and cadmium.

6. A process for the synthesis of vinyl acetate, which comprises passing a gaseous mixture of acetic acid and acetylene at a temperature from about 175° C. to about 250° C. over a catalyst composed essentially of a member of the group consisting of silicates and polysilicates of zinc and cadmium.

FRÉDÉRIC FRANÇOIS
ALBERT BRACONIER.
JEAN DAWANCE.

REFERENCES CITED

The following references are of record in the file of this patent:

UNITED STATES PATENTS

| Number | Name | Date |
|---|---|---|
| 1,822,525 | Herrmann | Sept. 8, 1931 |
| 2,011,011 | Rabald | Aug. 13, 1935 |
| 2,165,428 | Waugh | July 11, 1939 |
| 2,176,958 | Dreyfus | Oct. 24, 1939 |
| 2,186,437 | Toussaint | Jan. 9, 1940 |
| 2,339,066 | Fischer | Jan. 11, 1944 |
| 2,342,463 | Fischer | Feb. 22, 1944 |

OTHER REFERENCES

Handbook of Chemistry and Physics, 28th Ed., 1944, pp. 358–359, 480–489.